(12) United States Patent
Whitehouse et al.

(10) Patent No.: US 8,128,038 B2
(45) Date of Patent: Mar. 6, 2012

(54) HIGH-LIFT DEVICE FOR AN AIRCRAFT

(75) Inventors: Ian Roy Whitehouse, Chepstow (GB); Edmund Kay, Bath (GB); Daniel Dodd, Portishead (GB)

(73) Assignee: Airbus UK Limited, Bristol (GB)

( * ) Notice: Subject to any disclaimer, the term of this patent is extended or adjusted under 35 U.S.C. 154(b) by 373 days.

(21) Appl. No.: 11/568,969

(22) PCT Filed: May 9, 2005

(86) PCT No.: PCT/GB2005/001730
§ 371 (c)(1),
(2), (4) Date: Jul. 6, 2007

(87) PCT Pub. No.: WO2005/108205
PCT Pub. Date: Nov. 17, 2005

(65) Prior Publication Data
US 2007/0241236 A1  Oct. 18, 2007

(30) Foreign Application Priority Data
May 10, 2004  (GB) .................................. 0410375.0

(51) Int. Cl.
*B64C 3/50* (2006.01)
(52) U.S. Cl. ........................................ 244/214; 244/203
(58) Field of Classification Search .................... 244/216
See application file for complete search history.

(56) References Cited

U.S. PATENT DOCUMENTS

| | | | |
|---|---|---|---|
| 2,041,793 A * | 5/1936 | Stalker | 244/200.1 |
| 3,195,836 A | 7/1965 | Alvarez-Calderon | |
| 3,940,093 A | 2/1976 | Cabriere | |
| 4,200,253 A | 4/1980 | Rowarth | |
| 4,285,482 A | 8/1981 | Lewis | |
| 4,702,441 A * | 10/1987 | Wang | 244/204 |
| 4,753,402 A | 6/1988 | Cole | |
| 5,056,741 A * | 10/1991 | Bliesner et al. | 244/214 |
| 5,253,828 A * | 10/1993 | Cox | 244/200.1 |

(Continued)

FOREIGN PATENT DOCUMENTS
EP  0068737 A1  1/1983
(Continued)

OTHER PUBLICATIONS

Conventional Droop Leading Edge Device exemplified by an article in "Airbus News" published Aug. 2003.

(Continued)

*Primary Examiner* — Joshua Michener
*Assistant Examiner* — Brian M O'Hara
(74) *Attorney, Agent, or Firm* — Lowe, Hauptman, Ham & Berner, LLP (57) ABSTRACT

An aircraft comprises a wing (2) defining an aerofoil surface, the wing (2) comprising a drooped leading edge flap (1) being moveable between a stowed position and a deployed position. The wing (2) is so arranged that during flight when the high-lift device is in the deployed position, air may flow through an opening (7) in the wing (2) and over the aerofoil surface. During flight, air preferably flows into the boundary layer (13) on the upper surface of the wing (2). This energises the boundary layer (13), aft of the trailing edge of the drooped leading edge flap increasing its stability allowing the maximum achievable lift coefficient to be increased and hence reducing aircraft take-off and approach speeds.

24 Claims, 4 Drawing Sheets

U.S. PATENT DOCUMENTS

| | | | | |
|---|---|---|---|---|
| 5,927,656 A | * | 7/1999 | Hinkleman | 244/203 |
| 6,152,404 A | * | 11/2000 | Flaig et al. | 244/199.1 |
| 7,322,547 B2 | * | 1/2008 | Konings | 244/214 |
| 2006/0169847 A1 | * | 8/2006 | Konings | 244/214 |
| 2010/0219299 A1 | * | 9/2010 | Holzhausen | 244/214 |

FOREIGN PATENT DOCUMENTS

| | | |
|---|---|---|
| EP | 0302143 A1 | 2/1989 |

OTHER PUBLICATIONS

Schematic diagram of Airbus A380-800 published in "Flight International" in Summer 2003.

Search Report issued on GB Patent Application No. 0410375.0.

Search Report issued on PCT Patent Application No. PCT/GB2005/001730.

* cited by examiner

HIGH-LIFT DEVICE FOR AN AIRCRAFT

RELATED APPLICATIONS

The present application is a National Phase entry of PCT Application No. PCT/GB2005/001730, filed May 9, 2005, which claims priority from, British Application Number 0410375.0, filed May 10, 2004, the disclosures of which are hereby incorporated by reference herein in their entirety.

TECHNICAL FIELD

This invention relates to aircraft, and in particular, but not exclusively to those having high-lift leading edge devices and to the use thereof.

BACKGROUND OF THE INVENTION

High-lift leading edge devices are often used on an aircraft to increase the available maximum lift, particularly during take-off and landing. Two known high-lift leading edge devices are the slat and the drooped leading edge flap.

Slats are generally moveable between a retracted position in which the slat is located against the leading edge of the wing and a deployed position in which the slat is deployed downwards and forwards away from the main portion of the wing. The interaction between the separate flow fields of the slat and the main wing portion respectively is able to reduce the flow velocity induced by the leading edge of the main wing portion and change the pressure gradients on the wing surface to reduce the susceptibility to detachment of airflow from the wing, thereby allowing the aircraft to be flown at higher angles of attack than could otherwise be achieved. The slats are typically mounted for movement on tracks which can be bulky and heavy.

Drooped leading edge flaps, typified by those disclosed in U.S. Pat. No. 4,200,253 and EP 0 302 143, are moveable between a stowed position and a deployed position in which the drooped leading edge flap is turned nose-down. During high incidence flight a drooped leading edge flap reduces the leading edge suction peak experienced by the free stream onset flow. This is due to the deployed leading edge being better aligned to the freestream such that the flow does not negotiate the relatively low radius of curvature of the clean leading edge. The result is a reduction in the acceleration experienced by the flow and a subsequent reduction in the severity of the adverse decelerating pressure gradient further downstream. The net effect is a delay in the onset of wing stall to higher incidences compared to the undeployed wing geometry It will be understood, therefore, that the benefits of the slat and drooped leading edge flap respectively, exist as a result of different aerodynamic behaviour. In addition, the two devices differ in that movement of a slat is usually described by a combination of a component of rotation and a relatively large component of translation, whereas the movement of a drooped leading edge device is usually described by just a rotation, as shown for example in U.S. Pat. No. 4,200,253 and EP 0 302 143, with little or zero translational movement Also, drooped leading edge flaps may be inherently quieter, and better meet current noise level requirements, than other high-lift devices such as slats.

Drooped leading edge flaps are generally sealed or abutted against the adjacent portion of the main wing on the upper and/or lower surfaces to form a continuous aerofoil surface. If the design of the drooped leading edge flap were such that a discontinuity could be formed between the upper trailing edge of the drooped leading edge flap and the adjacent portion of the main wing (despite there being a seal between), a step might be formed that could disrupt the air flow over the wing, reducing the maximum lift coefficient and increasing the drag. As such, drooped leading edge flaps of the prior art are designed so that in use a substantially continuous surface is maintained between a drooped leading edge flap and the adjacent portion of the wing (the main wing element). As such, the movement of the drooped leading edge flap over the main wing element leading edge, as occurs during deployment, requires a complex sealing system or camming arrangement, such as that shown in EP 0 302 143. Such a system or arrangement may often only be reliably achieved with the addition of considerable weight, complexity and cost.

The present invention seeks to provide an aircraft that is able to benefit from the advantages of a high lift device, such as a drooped leading edge flap or a slat, whilst mitigating at least some of the above-mentioned problems.

SUMMARY OF THE INVENTION

The present invention provides an aircraft comprising a wing defining an aerofoil surface, the wing comprising a drooped leading edge flap, the drooped leading edge flap being moveable between a stowed position and a deployed position, wherein the wing is so arranged that at least during certain flight conditions when the drooped leading edge flap is in the deployed position, air is caused to flow through an opening in the wing and over the aerofoil surface.

Embodiments of the present invention therefore provide an aircraft including a drooped leading edge flap that does not require a seal or abutment between the trailing edge of the drooped leading edge flap and the adjacent portion of the wing structure. Moreover, it has been found that allowing a drooped leading edge flap to expose an opening on being deployed (as preferred in embodiments of the present invention) provides significant, and surprisingly advantageous aerodynamic benefits, said benefits resulting from aerodynamic behaviour different from that occurring with other high-lift devices such as slats. For example, slats typically provide aerodynamic benefits by virtue of the interaction of the separate flow fields generated around the slat and the adjacent wing portion, respectively; whereas the aerodynamic benefits provided by embodiments of the present invention are derived from effects such as for example injecting air flow into the boundary layer on the wing portion adjacent to the drooped leading edge flap. Such aerodynamic benefits are described in further detail below.

It will be understood that the drooped leading edge flap may be moveable to more than one deployed position. For example, the deployed position may differ in accordance with the flight conditions. For example, the deployed position of the drooped leading edge flap on take-off may be different to the deployed position of the drooped leading edge flap on landing.

Preferably, the wing is so arranged that at least during certain flight conditions, air flows through the opening, and exits onto the upper surface of the wing. Advantageously, in certain embodiments of the invention, the wing is so arranged that at least during certain flight conditions air flows through the opening and into a boundary layer on the wing. Advantageously, in certain embodiments of the invention, the air exits the opening in a direction substantially parallel to the aerofoil surface at the location of the opening. Ejecting air onto the upper surface of the wing, or more preferably injecting air into the boundary layer on the upper surface of the wing, introduces extra momentum to the boundary layer. Preferably, the opening is arranged to allow air to flow onto a region on the wing in which the boundary layer has become retarded, for example due to an adverse pressure gradient (pressure increasing in the direction of flow). Mixing high-energy flow (extra momentum) into the relatively slow-moving air of the boundary layer energises the boundary layer and reduces its susceptibility to separation from the aerofoil surface. Injecting air flow into the boundary layer may therefore allow the aircraft to achieve an increase in the maximum achievable lift coefficient, hence reducing stalling speed.

The opening may be arranged to allow air to flow into a region on the wing in which the boundary layer has become disrupted, for example due to there being a step between the drooped leading edge flap and the adjacent portions of the wing. It will be understood that such a region may also be a region in which the boundary layer has become retarded. Again, mixing higher-energy airflow into the relatively slow air of the boundary layer energises the boundary layer and reduces its tendency to separate. The boundary layer may therefore remain substantially attached, for example in the region of any such step, and downstream thereof, thereby reducing drag.

As is known in the art, the boundary layer is a thin layer formed at boundaries in almost any fluid flow system, such systems often being so modelled that the boundary layer is the only region in which viscosity is deemed to have an effect. It shall be understood that the thickness of the boundary layer may be defined in a number of ways. By way of example, the thickness of the boundary layer may be measured from the displacement thickness. Alternatively the thickness may be measured from the momentum thickness. The thickness of the boundary layer may also be defined by the height above the surface, over which the fluid flows, at which height the fluid velocity reaches a given percentage of the freestream velocity, for example 99% of the freestream velocity. The air flow through the opening may include itself a boundary layer, said boundary layer having been formed on a surface that defines the opening or a part thereof.

Air may be caused to flow through the opening only during certain flight conditions. These certain flight conditions might occur only during a high-lift manoeuvre. Additionally, or alternatively, those certain flight conditions might occur only during take-off and/or landing.

The opening may be defined by an opening in the main portion of the wing (excluding the drooped leading edge flap). The opening may be defined by an opening in the drooped leading edge flap. Preferably, the opening is defined by one or more openings in both the main portion of the wing and the drooped leading edge flap. The opening may be in the form of one or more holes.

The opening may comprise a slot at the upper surface of the wing. The opening may be in the form of a passageway leading from the upper surface of the wing to the source of the air flow through the opening. The opening may be located in the region between the drooped leading edge flap and the adjacent portion of the wing. Advantageously, in certain embodiments of the invention, the opening is defined by a gap between the drooped leading edge flap and an adjacent portion of the wing. Preferably, the gap comprises a slot-shaped portion. It shall be understood, however, that the width and/or depth of the gap may not necessarily be constant. For example, the distance between the surfaces defining the gap, of the drooped leading edge flap and of the adjacent main portion of the wing, may differ at different locations in the gap. The gap region between the drooped leading edge flap and the adjacent portion of the wing (defining the gap) may comprise a cavity, the cavity being formed for example between the rearward surface of the drooped leading edge flap and the forward surface of the adjacent portion of the wing. The structure or structures defining the gap may include regions that are open along the upper and lower surfaces of the wing. Alternatively, or additionally, the structure or structures defining the gap may include regions that are open at one or both of the spanwise ends of the drooped leading edge flap. The spanwise ends of the drooped leading edge flap may be thought of as the ends of the drooped leading edge flap nearest and furthest from the aircraft fuselage, for example the inboard and outboard ends of the drooped leading edge flap.

Preferably, the wing is so arranged that at least some of the air that flows through the opening is drawn from a region on the lower surface of the wing. More preferably, the wing is so arranged that at least some of the air that flows through the opening is drawn from a region at a spanwise end of the drooped leading edge flap. Even more preferably, at least some of the air is drawn from a combination of a region on the lower surface of the wing and a region at a spanwise end of the drooped leading edge flap.

Advantageously, in certain embodiments of the invention, the wing is so arranged that the flow of air through the opening is driven by pressure gradients, said pressure gradients being formed as a result of the pressure distribution around the wing. For example, during flight, the air travelling over the lower surface of the wing and the air in the region of the spanwise ends of the drooped leading edge flap, may be at substantially higher pressure than the air travelling over the upper surface of the wing. The opening may be arranged such that the air is able to flow from the regions of higher pressure to the region of lower pressure. Whilst the source of the flow of air flowing through the opening may consist solely of air around the wing driven by the pressure distribution around the wing, it will be understood that the aircraft may be arranged such that other sources of airflow may provide all or some of the airflow through the opening.

Whilst not necessarily precluded from being provided with such seals, the drooped leading edge flap is preferably not provided with a sealing system for sealing between the drooped leading edge flap and the leading edge of the adjacent wing structure when the droop leading edge flap is deployed. Not providing such a sealing system may reduce the complexity, weight and cost of the drooped leading edge arrangement. Embodiments of the present invention may therefore facilitate a simpler, lighter and cheaper drooped leading edge flap arrangement. Seals may however be provided for other purposes. For example, there may be a seal, in the form of a rubber lip or the like, that, when the drooped leading edge flap is in its stowed position, seals the lower surfaces of the trailing edge of the drooped leading edge flap and the leading edge of the adjacent wing structure.

The drooped leading edge flap is conveniently so arranged that when in its stowed position the amount of air flowing through the opening is significantly reduced, and preferably, the air flow is reduced to zero or at least to a negligible amount. Advantageously, in certain embodiments of the invention, the drooped leading edge flap is so arranged that, when the drooped leading edge flap is in the stowed position, the opening is closed. Closure of the opening may result in substantially no air being able to flow through said opening. Preferably, the drooped leading edge flap is so arranged that when stowed substantially no extra air is injected into the boundary layer on the wing (compared to the notional case where the drooped leading edge flap is deployed, but the opening is closed over).

The drooped leading edge flap may be so arranged that, during flight, when the drooped leading edge flap is in its deployed position, the amount of air flowing through the opening depends on the aerodynamic loads on the droop leading edge flap. For example, when the drooped leading edge flap is in its deployed position, during certain flight conditions, for example yielding low lift, substantially no air flows through the opening, the opening is substantially closed or no opening is defined.

Advantageously, in certain embodiments of the invention, the drooped leading edge flap is so arranged that during certain flight conditions, when the drooped leading edge flap is in its deployed position, aerodynamic loads at least assist, preferably cause (at least partially), and, more preferably are the sole cause of, the opening of the opening. The drooped leading edge flap may comprise a trailing edge that, when the drooped leading edge flap is deployed, is immediately adjacent to the upper surface of the leading edge of the wing structure adjacent to the droop leading edge flap. The trailing edge of the drooped leading edge flap may be arranged such that under certain flight conditions it touches the adjacent wing structure, whereas under different conditions a gap is formed therebetween. The drooped leading edge flap is preferably so arranged that, during certain flight conditions when the drooped leading edge flap is deployed, a sufficient pressure differential exists between upper and lower surfaces of the drooped leading edge flap that the opening may be formed due to the action of aerodynamic loads lifting the trailing edge of the drooped leading edge flap off the adjacent portion of the wing. Preferably, the size of the opening is variable and depends on the aerodynamic loads on the drooped leading edge flap. Tests have shown that such an arrangement (one in which the size of the opening is variable in dependence on aerodynamic loading) enables the maximum achievable lift coefficient to remain relatively high over a range of flight conditions and aerodynamic loads, as compared to the case where seals are provided to prevent air flow through the gap between the drooped leading edge flap and the adjacent wing structure.

The drooped leading edge flap is conveniently rotatably mounted for movement between its stowed and deployed positions. Advantageously, in certain embodiments of the invention, the axis of rotation of the drooped leading edge flap coincides with the body of the wing. Preferably, the axis of rotation of the drooped leading edge flap is located so that the axis of rotation is located away from the chord of the aerofoil and, preferably additionally, located so that it is in general alignment with and/or located towards, the lower surface of the wing. It shall be understood that the axis of rotation need not necessarily be defined by an actual component, for example, a hinge line or pivot point. The axis of rotation may be an axis about which the drooped leading edge flap is able to be notionally rotated to achieve a position change. The drooped leading edge flap may be so arranged that the position of the drooped leading edge flap in its deployed positions and the position of the drooped leading edge flap in its stowed position are such that a simple rotation would map one of the positions onto the other, even if the motion used in reality is not in the form of simple rotation. The movement of the drooped leading edge flap between its stowed and deployed positions may be achieved using a series of movements, including translations, by using for example an arrangement of cranks and sliders. The axis of rotation is preferably fixed relative to the wing.

Preferably, the drooped leading edge flap is supported by a strut. The drooped leading edge flap may be supported by a plurality of struts. For example, the drooped leading edge flap may be supported by struts located at either spanwise end of the drooped leading edge flap and attached to the adjacent wing structure. Preferably the struts are rotatably attached to the adjacent wing structure.

During flight, and particularly during high-lift manoeuvres, the flow may be particularly prone to separation downstream of certain portions of the wing, including for example a portion of the wing directly above the engine nacelle. It may be especially desirable to increase the stability of the boundary layer in these particular regions. Whilst it may not be suitable or appropriate to employ high-lift devices on such portions of the wing, (the absence of such devices in itself possibly increasing the likelihood of flow separation), features of embodiments of the present invention may be used to great advantage in relation to these regions in particular, possibly by means of arranging one or more drooped leading edge flaps of the invention directly adjacent to such portions of the wing.

The wing may further comprise a plurality of vortex generators, arranged such that during flight, when the drooped leading edge flap is in the deployed position, air flows past the vortex generators and vortices are introduced to the air flow. The vortex generators are preferably in the form of sub boundary layer vortex generators; these being of a height less than the thickness of the local boundary layer. Each vortex generator is conveniently in the form of a device that introduces vortices to a fluid flow, for example by means of the air flow (arising from the aircraft's movement relative to its surroundings) in the vicinity of the vortex generator interacting with the vortex generator. The plurality of vortex generators may be arranged to stabilise the boundary layer flow over a portion of the wing. For example, the plurality of vortex generators may, during flight, cause vortices to be generated, the vortices subsequently interacting with the boundary layer over the wing, mixing high-energy air with the slower air of the boundary layer, thereby delaying the onset of flow separation.

Preferably, the rate of air flowing past the vortex generators is significantly reduced when the drooped leading edge flap is moved from the deployed position to the stowed position. For example, the vortex generators may be covered by part of the drooped leading edge flap when the drooped leading edge flap is in the stowed position. Advantageously, in certain embodiments of the invention, the vortex generators are shielded from most, and preferably any, air flow, when the drooped leading edge flap is in the stowed position.

Advantageously, in certain embodiments of the invention, the drooped leading edge flap further comprises a turning vane, wherein said turning vane is arranged to direct flow having a component of flow in the wing root-to-tip direction, so as to reduce the component of flow in the wing root-to-tip direction. Preferably the turning vane is arranged to increase the streamwise component of the flow. The turning vane may be arranged to increase the chordwise component of the flow. It will be understood that the turning vane may be any element used to direct flow towards a given direction. The turning vane is conveniently located such that at least some air flows via the turning vane before exiting out of the opening. In the case where the opening comprises a cavity, the turning vane is preferably located within the cavity. The turning vane is preferably fixedly mounted on the drooped leading edge flap. In an embodiment described below, the turning vane is located on the rearward surface, and at the outboard end, of the drooped leading edge flap, said turning vane being arranged to direct flow in a wing root-to-tip direction along the opening into streamwise flow through the opening. The turning vane may facilitate an increased mass of air to flow through the opening, and in particular through the region of the opening directly downstream of the turning vanes, thereby preferably delivering more energetic air flow onto the upper surface of the wing and preferably increasing the maximum achievable lift coefficient in the downstream portion of the wing.

Advantageously, in certain embodiments of the invention, there is a variation in the spanwise direction of the size of the opening. For example, the size of the opening may be substantially larger in a first region of the wing than the size of the opening in a second region of the wing. For example, this larger part of the opening may be located in the region of an engine nacelle. Preferably, this larger part of the opening facilitates an increased mass of air to flow through the opening, preferably delivering more energetic air flow onto the upper surface of the wing and preferably increasing the maximum achievable lift coefficient. The shape of the opening may be such that the flow of air per unit length in the spanwise direction through a first region of the opening is greater than the flow of air per unit length through a second region of the opening.

The present invention also provides a wing including a drooped leading edge flap, the wing and drooping leading edge flap being arranged in accordance with the wing of the aircraft according to any aspect of the present invention as described herein. The present invention also provides a drooped leading edge flap suitable for use as the drooped leading edge flap of the aircraft according to any aspect of the present invention as described herein. There is also provided a kit of parts including a drooped leading edge flap, the parts being suitable for converting an aircraft into an aircraft according to any aspect of the present invention as described herein.

The present invention also provides a method of operating, for example flying, an aircraft, the aircraft having a wing defining an aerofoil surface and the wing having a drooped leading edge flap movable between a stowed position and a deployed position. In certain embodiments of the invention, the method advantageously includes a step of causing air to flow through an opening on the wing and over the aerofoil surface whilst the drooped leading edge flap is in its deployed position. The aircraft operated may be in the form of an aircraft according to any aspects of the aircraft of the invention described herein.

Preferably, the air is caused to flow through an opening in the wing between the drooped leading edge flap and the adjacent wing structure.

BRIEF DESCRIPTION OF THE DRAWINGS

Various embodiments of the invention will now be described, by way of example only, with reference to the accompanying schematic drawings of which.

DETAILED DESCRIPTION OF EMBODIMENTS

Figure 1A:
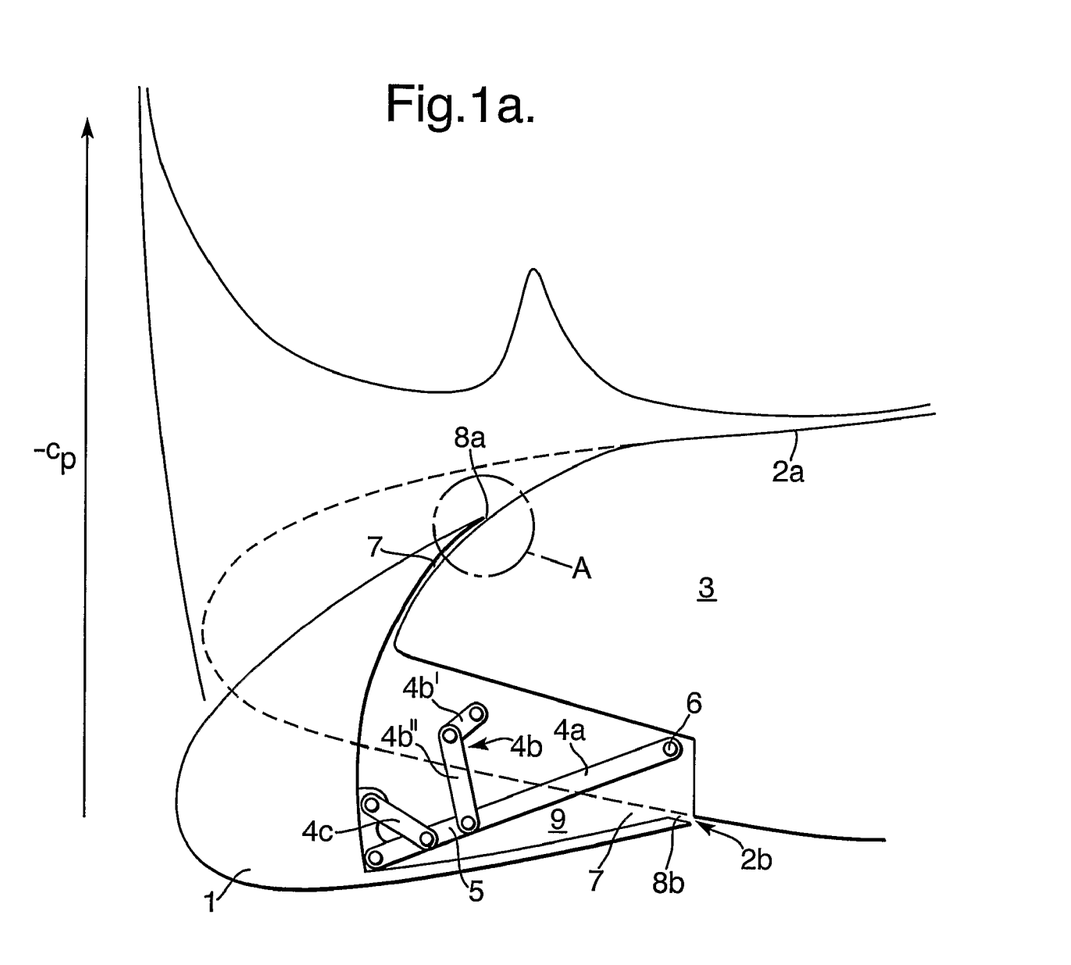
FIG. 1a shows a cross-sectional view of a drooped leading edge flap in a first embodiment of the invention, and a corresponding notional upper surface pressure distribution.
Figure 1B:
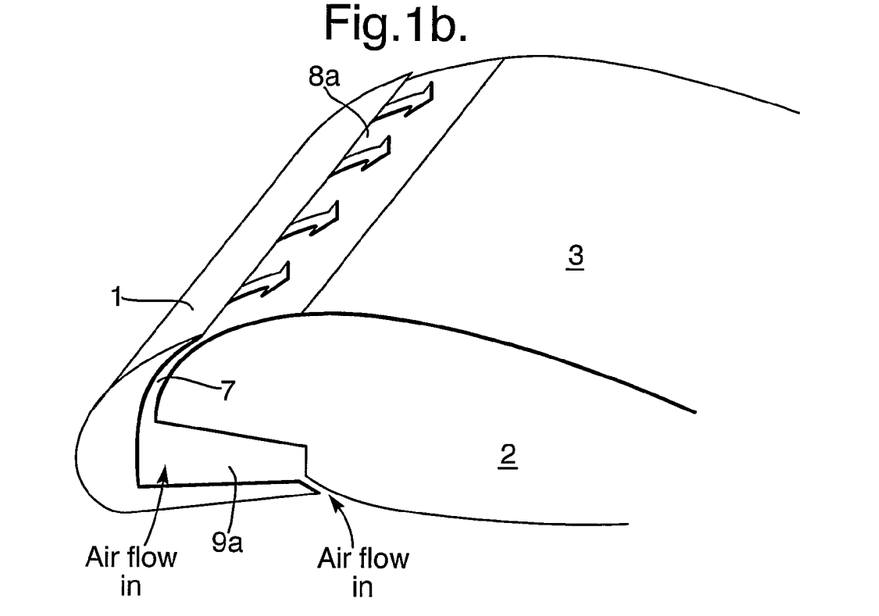
FIG. 1b shows a perspective view of the drooped leading edge flap according to the first embodiment of the invention.

FIGS. 1a and 1b show a drooped leading edge flap 1 which forms part of a wing 2, the drooped leading edge flap 1 being attached to the adjacent main wing portion 3, via a hinge mechanism 5. Both Figures illustrate the drooped leading edge flap 1 in the deployed position adopted during take-off, which in this embodiment is achieved by means of a 22 degree downward rotation of the drooped leading edge flap from the stowed position. (During landing, the drooped leading edge flap is rotated by 25 degrees downwards from the stowed position to a deployed position for landing, which is different from the deployed position for take-off.) The stowed position of the drooped leading edge flap 1 is indicated by the dotted line in FIG. 1a. The hinge mechanism 5 comprises a main arm 4a, drive arm 4b and connecting arm 4c. An axle 6 extends along the wing 2 in a direction approximately parallel to the leading edge of the wing 2. The main arm 4a is mounted at its base for rotation about the axle 6. The opposite end of the main arm 4a is fixedly connected to the drooped leading edge flap 1. The connecting arm 4c is fixedly mounted on the main arm 4a and the drooped leading edge flap thereby increasing the rigidity of the connection between the main arm 4a and the drooped leading edge flap 1. The drive arm 4b comprises an upper arm 4b' which is hinged with a lower arm 4b". The upper arm 4b' is connected to an actuator (not shown) and the lower arm 4b" is connected via a pivot joint to the main arm 4a near its middle. The actuator effects rotation of the upper arm 4b' of the drive arm 4b. The main arm 4a is thereby rotated about the axle 6, thereby moving the drooped leading edge flap between the stowed position and the deployed position.

In the stowed position, the drooped leading edge flap is sealed against the main wing portion 3 by means of a rubber lip (not shown) at the region of the lower end of the trailing edge of the drooped leading edge flap 1 that abuts the lower end of the leading edge of the adjacent wing portion.

The drooped leading edge flap is so shaped that when in the deployed position, there exists a cavity 9, formed between the rearward surface of the drooped leading edge flap 1 and the leading edge of the main wing portion 3.

In the deployed position, there exists an opening 7 between the drooped leading edge flap 1 and the adjacent main wing portion 3. The opening 7 is in the form of a gap, the gap comprising slots 8a & 8b on the upper and lower surfaces of the wing 2 respectively, and further including the cavity 9. An upper trailing edge and a lower trailing edge of the drooped leading edge flap 1 are immediately adjacent to the main wing portion 3 and define an upper gap (slot 8a) and a lower gap (slot 8b), respectively, to thereby define a cavity 9 between the drooped leading edge flap 1 and the main wing portion 3. In the first embodiment of the invention, the cavity is open at both spanwise ends 9a and 9b.

During flight, the local pressure on the upper surface 2a of the wing 2 is lower than the local pressure on the lower surface 2b of the wing 2, and lower than the local pressure at the spanwise ends 9a and 9b of the drooped leading edge flap 1. As a result of this pressure differential, air flows from the lower surface 2b of the wing 2 and spanwise ends 9a and 9b of the drooped leading edge flap 1, through the opening 7, to the upper surface 2a of the wing 2. The movement of the air in this manner is indicated by the large arrows in FIG. 1b and FIG. 2.

Such a movement of air affects the aerodynamics of the wing, and thereby produces a number of surprisingly advantageous effects. These effects include generating a second pressure peak in the upper-surface pressure distribution (as shown in FIG. 1a), and increasing the stability of the boundary layer over the wing, thereby allowing the wing to function effectively at higher angles of attack than would otherwise be possible for a drooped leading edge arrangement and thereby increasing the maximum available lift coefficient. An explanation of how these beneficial effects are thought to arise is provided with reference to FIG. 2.

Figure 2:
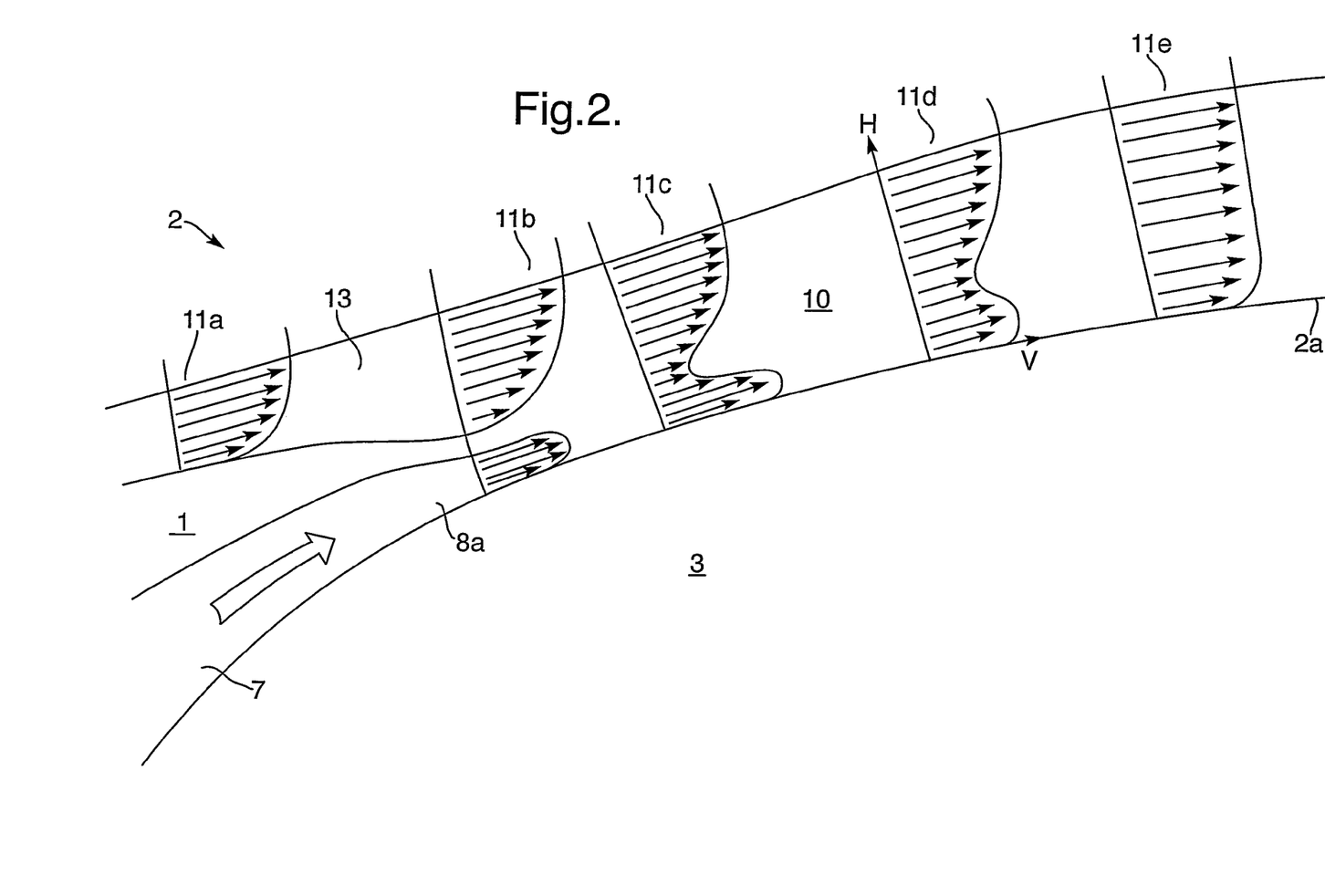
FIG. 2 shows a close-up of the region A of FIG. 1a, FIG. 3 shows a wing in a second embodiment of the invention.

FIG. 2 shows a close-up view of part of the opening 7 on the upper surface 2a of the wing 2. FIG. 2 also shows notional boundary layer velocity profiles 11a-11e at different points along the wing 2 and the boundary layer 13 of the wing 2. The boundary layer 13 is shown for illustrative purposes only and is not to scale. For the sake of clarity, the boundary layer on other surfaces, such as the surface of the wing within the opening has not been shown. The velocity profiles 11a-11e indicate the variation in air velocity (V) in the streamwise direction with the perpendicular height (H) from the surface of the aerofoil (see velocity profile 11d). It will also be understood that, for the sake of clarity, the left-most velocity profile 11a only indicates the velocity distribution in the boundary layer on the upper surface of the drooped leading edge flap and does not show the velocity distribution within the opening 7.

According to arrangements currently known in the art, the boundary layer on a wing in the region of the junction between a drooped leading edge flap and the main portion of the wing, experiences, for most flight conditions, an adverse pressure gradient. As a result, the velocity of the air in the boundary layer becomes retarded. The boundary layer in this region usually has, therefore, a typical boundary layer velocity profile. The left-most profile (velocity profile 11a) of FIG. 2, illustrates an example of such a typical profile. If the adverse pressure gradient is sufficiently severe or prolonged, it can cause the flow in the boundary layer further downstream to slow down to such a degree that it begins to reverse, resulting in boundary layer separation and ultimately stall.

According to the first embodiment of present invention the opening 7 is arranged such that the air flowing out of the slot 8a is directed into the boundary layer 13 on the upper-surface of the main portion of the wing 3, thereby injecting faster, higher momentum, air into the boundary layer 13 (velocity profile 11b). Directly downstream of the slot 8a, the air velocity in the lower near surface region of the boundary layer is increased, leading to an inflected velocity profile 11c. Such a velocity distribution in the boundary layer is unsustainable. There is therefore a mixing region 10, in which the air in the high velocity lower near surface region entrains, and mixes with, the air in the slower upper region of the boundary layer, away from the aerofoil surface. A notional velocity profile 11d in the mixing region 10 is shown in FIG. 2. The mixing of the air results in the boundary layer, a distance downstream, being 'energised' and adopting a 'fuller' profile 11e. Such a profile has a significantly steeper velocity gradient at the aerofoil surface than the relatively gentle profile 11a upstream of the opening 7. The boundary layer can therefore withstand a more severe and/or prolonged pressure gradient than the boundary layer upstream of the opening. In addition, the injection of air causes the flow to accelerate thereby creating a favourable pressure gradient aft of the opening 7 (as shown in FIG. 1a). The boundary layer is therefore re-energised in a region where it would have been retarded due to an adverse pressure gradient. This therefore delays the separation and stall.

The first embodiment of the invention therefore allows the wing 2 to be used at higher angles of attack, than would otherwise be possible for a drooped leading edge arrangement thereby allowing a higher maximum lift coefficient to be achieved.

Figure 3:
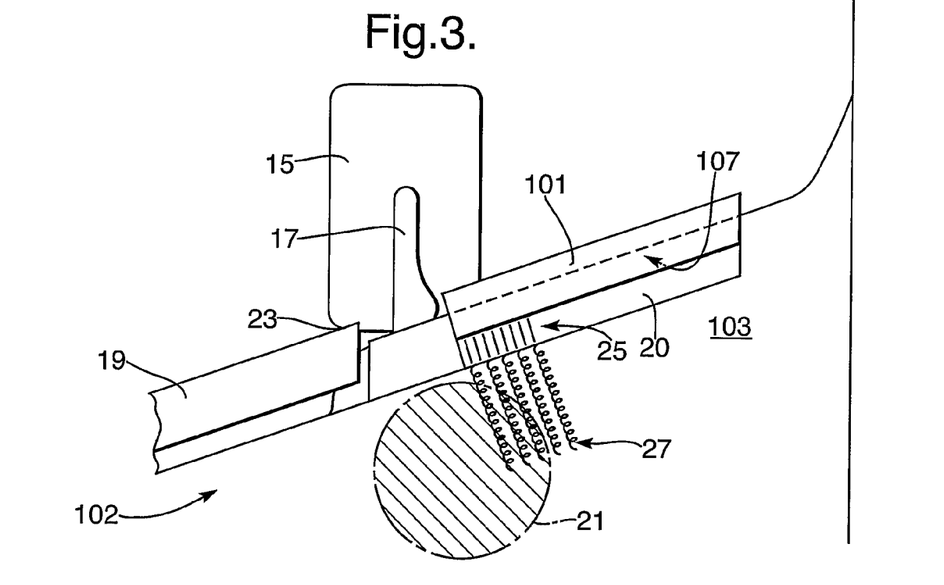

FIG. 3 shows an aircraft wing according to a second embodiment of the invention. A drooped leading edge flap 101 is located on the wing 102, inboard of the engine nacelle 15, which is supported on the engine pylon 17. Outboard of the engine nacelle 15, there is located a midboard section slat 19.

The drooped leading edge flap 101 is moved from the stowed position (not shown) towards the deployed position (the position in which it is shown in FIG. 3) by using an actuator (not shown) located within the wing 102. When the drooped leading edge flap 101 is deployed, a region 20 on the upper surface of the adjacent main portion of the wing 103 is exposed.

During flight, a pressure differential occurs between the upper and lower surfaces of the wing. During certain flight conditions when the drooped leading edge flap is in the deployed position, the wing 102 generates an aerodynamic force of sufficient magnitude and direction, such that the drooped leading edge flap 101 is caused to lift away from the surface of the adjacent main portion of the wing 103. The drooped leading edge flap 101 is arranged such that an opening 107 is thereby created, the opening 107 being of essentially similar shape and function to that described in relation to the first embodiment. In the third embodiment the opening is of course exposed when the drooped leading edge flap is in its deployed position irrespective of aerodynamic conditions.

The size of the opening is dependent on the magnitude and direction of the net aerodynamic force on the drooped leading edge flap.

The region 21 immediately downstream of the engine pylon 17 is more likely to be prone to boundary layer flow separation than elsewhere on the wing 102 due to the complex interplay between the three dimensional flow around the nacelle 15 and pylon 17 and the local boundary layer on the wing. In addition, this area of the wing 102 does not have the protection of a high-lift device to reduce the suction peak, owing to the way in which the engine is mounted on the wing.

During flight, air flows through the opening 107, and as described above, delays the onset of stall on the wing 102 downstream of the drooped leading edge flap 101. In addition, there are provided eight sub boundary layer vortex generators 25 located slightly downstream of the trailing edge of the deployed droop leading edge flap. During high lift flight, vortices 27 are imparted to the air flowing aft by the vortex generators 25 resulting in higher energy air from the outer boundary layer being mixed with lower energy air near the surface, thus stabilising the flow. The vortex generators 25 are arranged downstream of the opening 107 such that both the freestream air flow and the air that has come through the opening 107 can flow past the vortex generators 25.

When the drooped leading edge flap 101 is in the stowed position, as may be the case during cruise for example, the vortex generators 25 are covered by the drooped leading edge flap 101.

Figure 4:
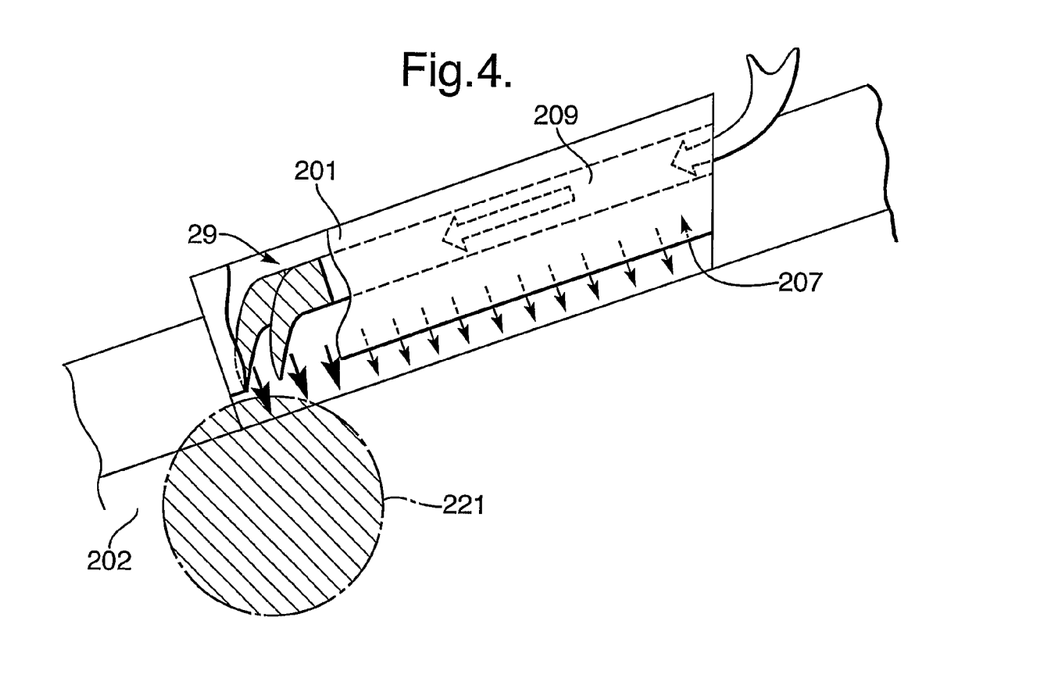
FIG. 4 shows a drooped leading edge flap in a third embodiment of the invention.

FIG. 4 shows a wing 202 according to a third embodiment of the invention. The drooped leading edge device 201 is arranged in a similar manner to that described above in the first embodiment of the invention. Thus, opening 207 is formed by the space between the rearward surface of the drooped leading edge flap, in its deployed position, and the leading edge of the main wing portion, which space defines upper and lower slots and a cavity 209 in the wing, connecting the slots. In addition, however, the drooped leading edge flap 201 includes two turning vanes 29 located within the cavity 209. In order to clearly show the location of the turning vanes 29, part of the wing 202 is shown in cutaway view in FIG. 4. Movement of air in the cavity 209 and through the opening 207 is indicated by the relatively large arrows. During flight, and particularly at high incidence, the pressure distribution over the wing will be such that flow in the cavity 209 will generally be in an inboard to outboard (wing root-to-tip) direction as indicated by the large arrows in FIG. 4. The turning vanes 29 are fixedly mounted on the rearward face of the drooped leading edge flap 201, and are arranged to direct the flow in the wing root-to-tip direction into approximately the streamwise direction, and out of the part of the opening 207 nearest the engine pylon (not shown). This increases the mass flow of air through the opening 207 and onto the wing 202 downstream of the pylon. The above-mentioned beneficial effects of momentum injection of air into the boundary layer are thereby increased in the critical region 221 (that region immediately downstream of the up-wash created by the engine nacelle and pylon).

Figure 5:
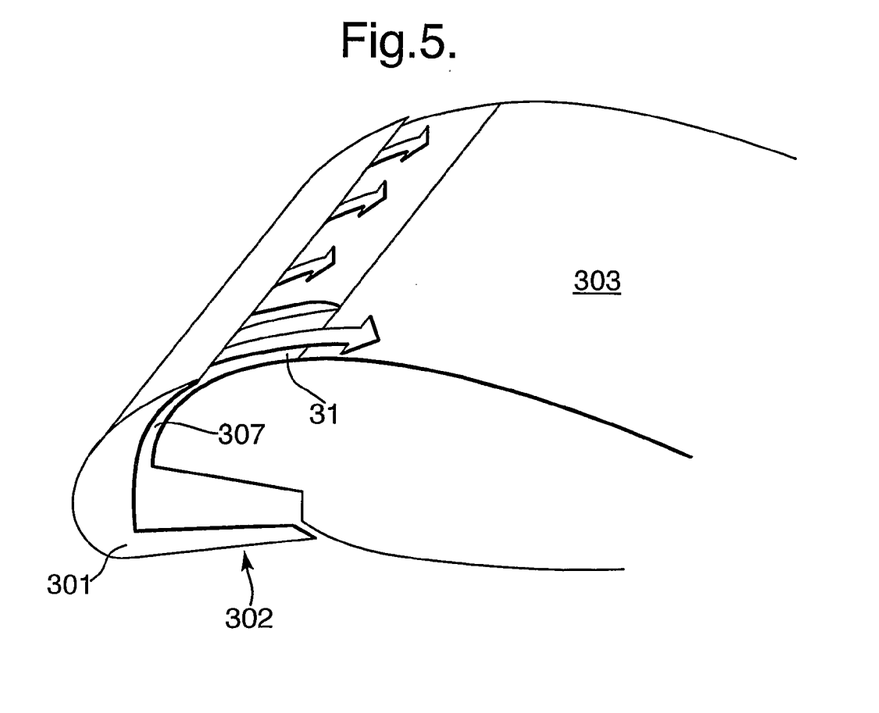
FIG. 5 shows a drooped leading edge flap in a fourth embodiment of the invention.

FIG. 5 shows a wing 302 according to a fourth embodiment of the invention. The large arrows indicate movement of air. The dimensions of the opening 307 are increased at the outboard end of the drooped leading edge flap 301. This is achieved by locally reshaping the leading edge 31 of the main wing portion 303 in this region. This allows an increased mass flow of air through the part of the opening 7 in this region, delivering even more energetic flow into, and further stabilising, the boundary layer. The outboard end of the drooped leading edge flap 301 is located near an engine pylon (not shown) and the drooped leading edge flap therefore stabilises the flow in this critical region.

It will be appreciated that various modifications may be made to the above-described embodiments of the invention. For example, the feature of the net aerodynamic force effecting movement of the drooped leading edge flap and thereby creating an opening (as described in relation to the second embodiment), need not necessarily be limited to movement of the entire drooped leading edge flap. The drooped leading edge flap may be sufficiently deformable that during certain flight conditions a portion of it, for example the upper end of the trailing edge of the drooped leading edge flap, is deformed sufficiently to create the opening.

A further embodiment of the present invention is envisaged in which in the deployed position, the lower surface of the drooped leading edge flap is sealed against the lower surface of the wing; air thus flowing via the openings in the spanwise ends of the drooped leading edge flap into the cavity between the drooped leading edge flap and the main wing element and then from the cavity out of the slot formed on the upper surface of the wing.

Features of the various embodiments may of course be combined to advantage. For example, the vortex generators described in the second embodiment, may be used in conjunction with a drooped leading edge flap comprising turning vanes according to the third embodiment of the present invention. The above-described embodiments directed towards stabilising a critical region of flow need not necessarily be related to stabilising a critical region of flow located on a wing in the vicinity of an engine nacelle.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft comprising:
a wing defining an aerofoil surface, wherein the wing comprises a main wing portion and a drooped leading edge flap, said main wing portion comprising an leading edge surface that extends from a leading edge chordwise distal point to an end point located on an upper surface of said main wing portion, the drooped leading edge flap being configured to rotate, around an axis of rotation, between a stowed position and a deployed position, and wherein the wing, at least during certain flight conditions, when the drooped leading edge flap is in the deployed position, is formed with at least one opening which is defined by
(a) an upper gap formed between and immediately adjacent to a rear surface of said drooped leading edge flap and at least part of said leading edge surface of said main wing portion,
(b) a lower gap formed between and immediately adjacent to a lower trailing edge of said drooped leading edge flap and a lower surface of said main wing portion,
(c) a cavity defined in said deployed position between the drooped leading edge flap and the main wing portion,
wherein the drooped leading edge flap is configured such that, during certain flight conditions, when the drooped leading edge flap is in its deployed position, aerodynamic loads cause, at least in part, to vary the size of the upper gap, and
whereby during said certain flight conditions, i) air flows into the cavity through the lower gap, and ii) air flows out from the cavity through the upper gap and is mixed into the air of a boundary layer on the upper surface of the wing, thereby energizing the boundary layer and reducing it's susceptibility to separation from the aerofoil surface.

2. An aircraft according to claim 1, wherein the cavity has a cavity entry at a spanwise end of the drooped leading edge flap configured to allow air to flow into the cavity.

3. An aircraft according to claim 2, wherein the shape of the upper gap is such that the flow of air, per unit length in the spanwise direction, through a first region of the upper gap is greater than the flow of air, per unit length in the spanwise direction, through a second region of the upper gap.

4. An aircraft according to claim 2, wherein the aircraft is so arranged that, at least during certain flight conditions when the drooped leading edge flap is in the deployed position, the air flow, in the space between the drooped leading edge flap and the adjacent portion, at the region at the spanwise end of the drooped leading edge flap includes a spanwise component as a result of the direction of the flow of air drawn at said region.

5. An aircraft according to claim 1, wherein the wing is so arranged that at least some of the air that flows through the cavity is drawn from a region on the lower surface of the wing.

6. An aircraft according to claim 1, wherein the wing is so arranged that the flow of air through the cavity is driven by pressure gradients, said pressure gradients being formed as a result of the pressure distribution around the wing.

7. An aircraft according to claim 1 so arranged that, when the drooped leading edge flap is in the stowed position, the upper gap is closed.

8. An aircraft according to claim 1, wherein said drooped leading edge flap further comprises an axis of rotation, and wherein said axis of rotation coincides with the main wing portion.

9. An aircraft according to claim 1, the drooped leading edge flap further comprising a turning vane, wherein said turning vane is arranged to direct flow having a component of flow in the wing root-to-tip direction, so as to reduce the component of flow in the wing root-to-tip direction.

10. A drooped leading edge flap suitable for use as the drooped leading edge flaps of the aircraft according to claim 1.

11. A kit of parts including a drooped leading edge flap, the parts being suitable for converting an aircraft into an aircraft according to claim 1.

12. An aircraft according to claim 1, wherein the air drawn in from the region at the spanwise end flows along the wing in a spanwise direction.

13. A drooped leading edge flap suitable for use as the drooped leading edge flaps of the aircraft according to claim 1.

14. A kit of parts including a drooped leading edge flap, the parts being suitable for converting an aircraft into an aircraft according to claim 1.

15. The aircraft of claim 1, wherein said rear surface of said drooped leading edge flap is contoured to follow at least a part of said leading edge surface of said main wing portion when said drooped leading edge flap rotates between a stowed position and a deployed position.

16. An aircraft according to claim 1, the wing further comprising a plurality of vortex generators arranged such that, during flight when the drooped leading edge flap is in the deployed position, air flows past the vortex generators and vortices are introduced into the air flow.

17. An aircraft according to claim 16, wherein the vortex generators are shielded from any air flow when the drooped leading edge flap is in the stowed position.

18. An aircraft according to claim 1, wherein a size of the upper gap at a first region of the cavity is substantially larger than the size of the upper gap at a second region.

19. An aircraft according to claim 18, wherein the first region corresponds to a region near an engine nacelle, and the second region corresponds to a region away from the engine nacelle.

20. A method of operating an aircraft, wherein the method comprises the following steps:
providing an aircraft (10) having a wing (12) defining an aerofoil surface, the wing having a wing tip (18), a main wing portion comprising a leading edge surface (68) that extends from a leading edge chordwise distal point (70) to an end point (at 64) located on an upper surface (64) of the main wing portion, and a drooped leading edge flap (20) configured to rotate, around an axis (80) of rotation, movable between a stowed position (FIG. 2) and a deployed position (FIG. 4), and flying the aircraft (Column 3, Lines 50-51), moving the drooped leading edge flap to the deployed position (Column 4, Line 1), and an upper trailing edge (44) and a lower trailing edge (48) of the drooped leading edge flap being immediately adjacent to the main wing portion (12, 70) to define (a) an upper gap (34) formed between and immediately adjacent to a rear surface (rear of 40 and 52) of said drooped leading edge flap and at least part of said leading edge surface (64) of said main wing portion (12), (b) a lower gap (98) formed between and immediately adjacent to a lower trailing edge (48) of said drooped leading edge flap and a lower surface (72) of said main wing portion, and (c) a cavity (96) between the drooped leading edge flap (20) and the main wing portion (14), wherein the drooped leading edge flap is configured such that, during certain flight conditions, when the drooped leading edge flap is in its deployed position, aerodynamic loads cause, at least in part, to vary the size of the upper gap, and
whereby air is caused to: i) flow into the cavity through the lower gap, and ii) air flows out from the cavity through the upper gap and is mixed into the air of a boundary layer (near the top of arrow 36) on the upper surface of the wing (64), thereby energizing (any additional airflow will add energy to the boundary layer) the boundary layer and reducing it's susceptibility to separation from the aerofoil surface.

21. A method according to claim 20, further comprising the step of providing a cavity entry at a spanwise end of said drooped leading edge flap, and wherein the flow of air through the cavity is driven by pressure gradients formed as a result of the pressure distribution around the wing.

22. A method according to claim 21, wherein the drawing of the air from the region at the spanwise end of the drooped leading edge flap causes spanwise flow of air along the wing between the deployed drooped leading edge flap and the adjacent portion of the wing.

23. A method of according to claim 20, wherein when the drooped leading edge flap is moved to the deployed position, a space is defined between the drooped leading edge flap and the main wing portion, the space having a spanwise end, air passes into the space from the spanwise end of the space, flows in a spanwise direction along the space towards the wing tip, and flows from the space into a boundary layer on the upper surface of the wing.

24. A method according to claim 23, wherein air is also drawn into the space from the lower surface of the wing.

* * * * *